Feb. 16, 1943.  F. H. HOY  2,310,956
APPARATUS FOR THE MULTIPLE MOLDING OF HAMS AND THE LIKE
Filed July 31, 1940  4 Sheets-Sheet 1
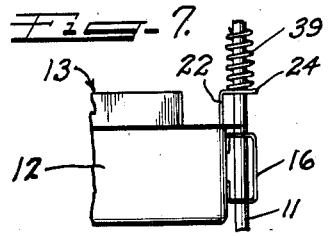
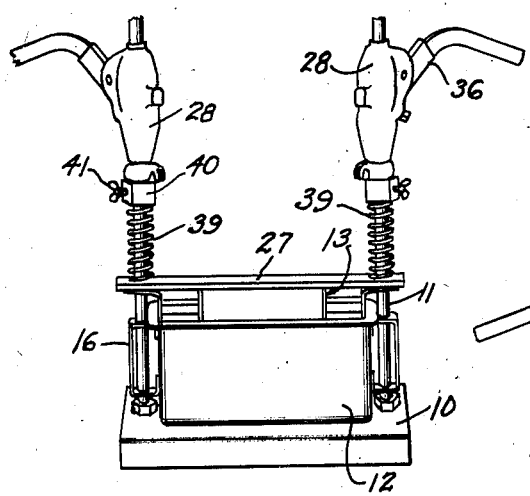
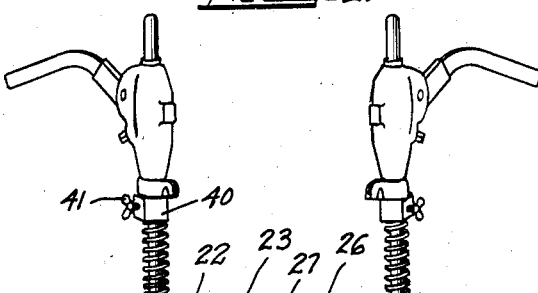
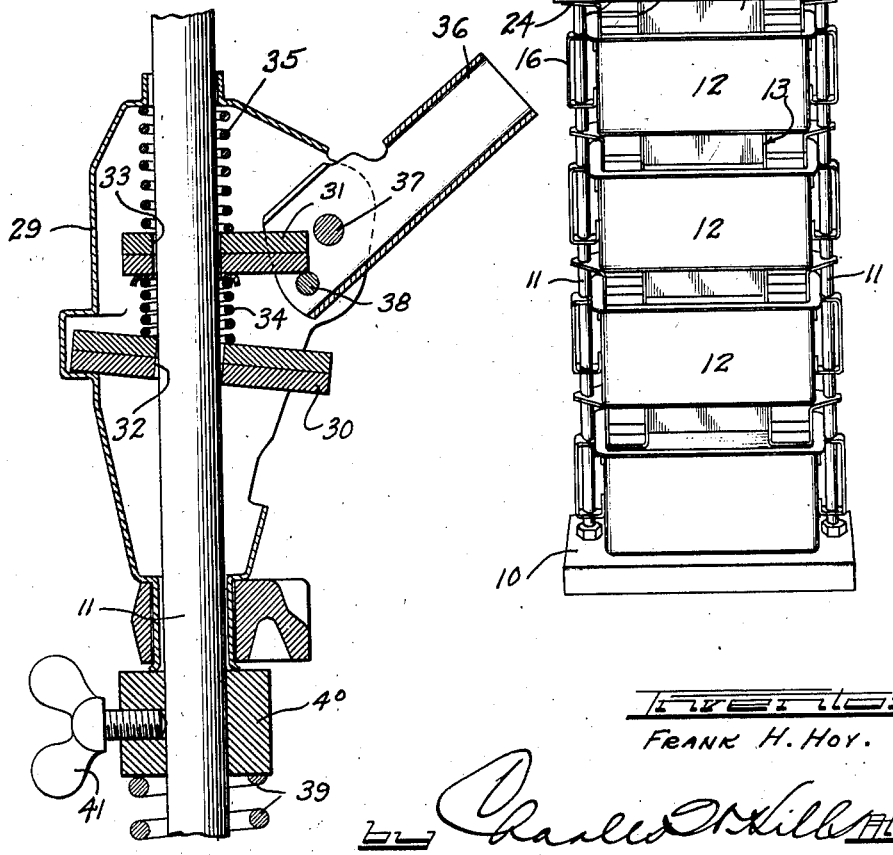
Inventor
FRANK H. HOY.

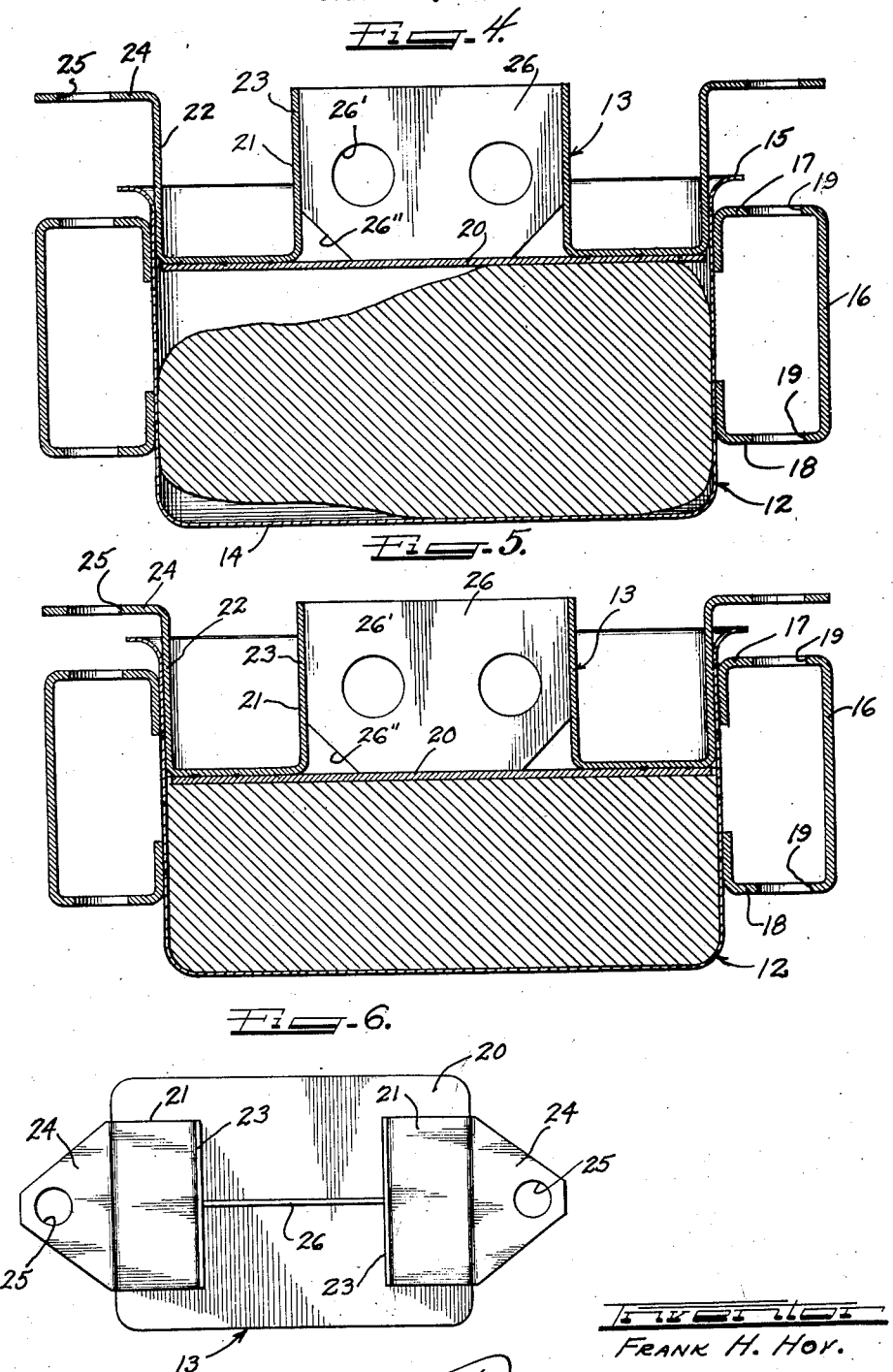

Feb. 16, 1943. F. H. HOY 2,310,956
APPARATUS FOR THE MULTIPLE MOLDING OF HAMS AND THE LIKE
Filed July 31, 1940 4 Sheets-Sheet 3
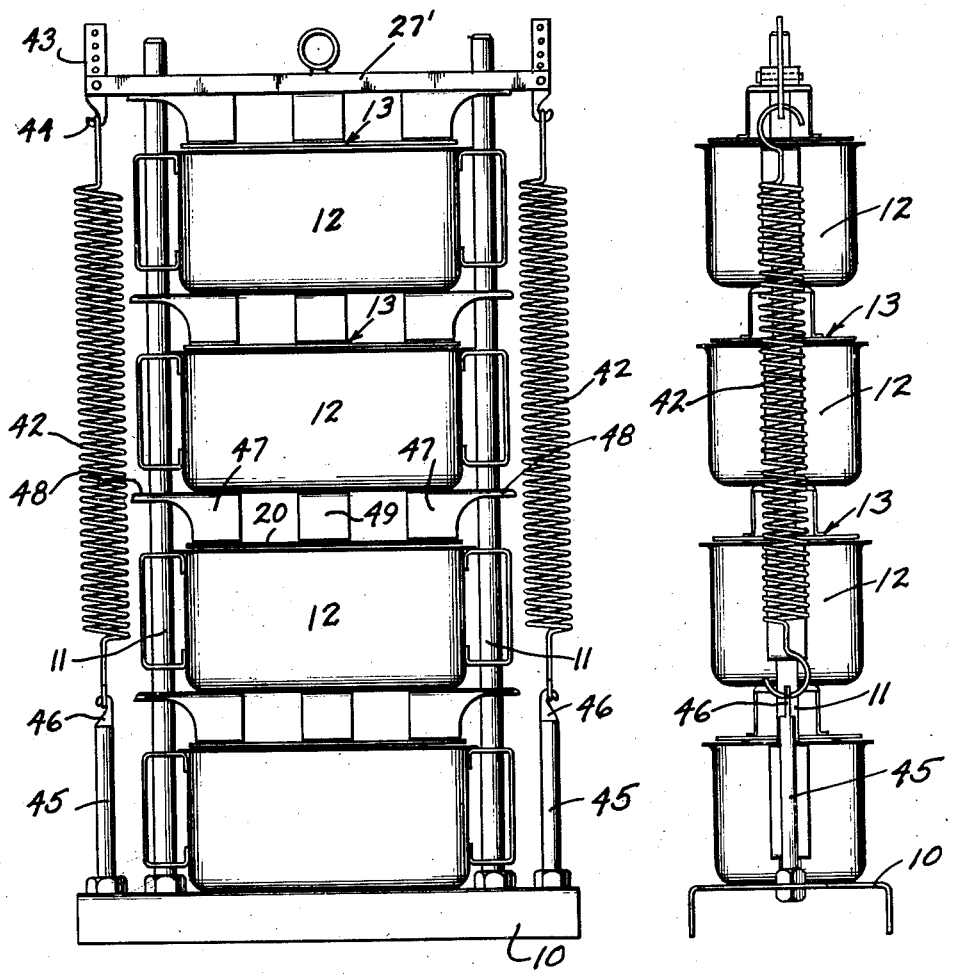
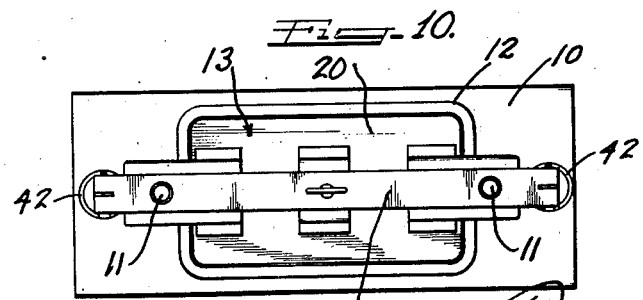
Inventor
FRANK H. HOY.

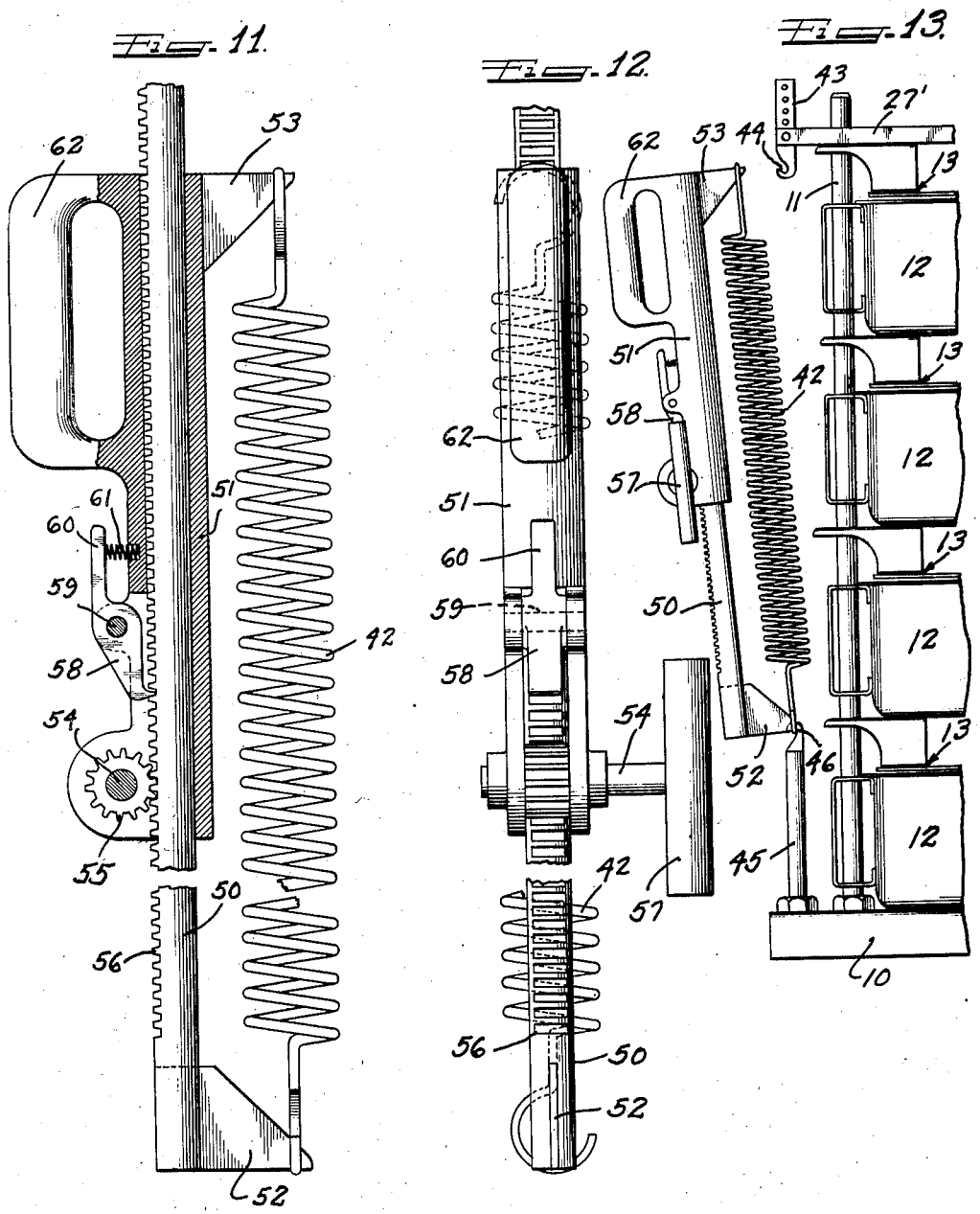

Patented Feb. 16, 1943

2,310,956

UNITED STATES PATENT OFFICE 2,310,956

APPARATUS FOR THE MULTIPLE MOLDING OF HAMS AND THE LIKE

Frank H. Hoy, Milwaukee, Wis.

Application July 31, 1940, Serial No. 348,630

11 Claims. (Cl. 53—22)

This invention relates in general to an improved apparatus for practicing the method for the pressing and cooking of meat products, and is more particularly concerned with such method and apparatus for the cooking and molding of meats such as hams and the like, from which the bones have been removed or other meats.

Heretofore, it has been the practice to provide individual molds with pressure applying means for each mold. In such arrangements, it was necessary to individually press each ham in its mold. Such practice has proved uneconomical in that it not only entailed greater labor cost, but also necessitated the utilization of more and expensive equipment. Moreover, the pressure applying means for the individual molds were inadequate to provide at all times sufficient pressure to produce a molded product having the most desirable characteristics.

The present invention contemplates improved apparatus of more simple construction than heretofore available, which is so constructed to enable the simultaneous or multiple molding and processing of a plurality of hams or quantities of a meat product, with the result that the cost of equipment and labor are materially decreased and the molded product may be more economically produced. By the utilization of my improved apparatus it has been found that it is possible to effect a material saving in the labor costs.

It is a further object of the invention to provide a novel apparatus for the multiple molding of a meat product such as ham, wherein the same containers or molds and followers may be utilized interchangeably as single units or multiple units, as desired, without the necessity of having to provide containers or followers having different construction.

Another object is to provide apparatus for such purpose, which utilizes improved means for obtaining greater pressures than were heretofore possible, and yet which is so arranged as to permit movement of the product being molded during the processing operations.

Still another object is to provide as an article of manufacture an improved molding pan or container having parts arranged for association with guide members in such a manner as to enable movement of the pan or container along the guide members, but support the pan against tilting.

It is also an object of the invention to provide an improved presser element construction for utilization with the pans or containers.

Yet another object of the invention resides in the novel method of mutiple molding of meats which may be practiced by the utilization of my novel molding apparatus.

A still further object of the invention is to provide improved molding apparatus having removable pressure applying springs which may be stressed, attached and detached by means of a novel tool.

Other objects and features of the invention will more fully appear from the following detailed description, taken in connection with the accompanying drawings, which illustrate several embodiments thereof, and in which:

Figure 1 is a perspective view showing one form of the present invention as being embodied in a single unit for the molding of a single ham or other meat product to form a single loaf;

Figure 2 is a similar view showing its embodiment in apparatus for the multiple molding of a meat product;

Figure 3 is an enlarged fragmentary sectional view showing the working parts of the pressure applying jacks as utilized in this embodiment of the invention, and the manner in which these jacks are associated with the guide members of the apparatus as well as means for securing the spring members in compressed or pressure applying condition;

Figure 4 is an enlarged longitudinal section view taken through a mold container and the associated presser member of the same, to show certain novel features of the construction thereof, the position of the presser being shown in its initial position when a ham has been placed in the container;

Figure 5 is a similar view showing the presser in its position after pressure has been applied thereto, the meat product being shown in molded condition;

Figure 6 is a plan view of the presser member;

Figure 7 is a fragmentary view in elevation showing the manner in which pressure may be applied through the springs of the apparatus directly to parts of the presser member without utilizing an equalizer bar as shown in Figures 1 and 2.

Figure 8 is a front elevational view of multiple molding apparatus embodying the features of the present invention, the apparatus in this case having differently arranged pressure applying means:

Figure 9 is a side view of the same;

Figure 10 is a plan view;

Figure 11 is an elevational view partly in section showing the constructional details of a tool for use with this form of the invention for attaching and removing the pressure applying springs;

Figure 12 is a side view of the same; and

Figure 13 is a view illustrating the manner in which the tool is utilized.

As shown on the drawings:

For illustrating the present invention, the apparatus is disclosed in the drawings as comprising a base member 10 of any suitable construction, but which may be in the form of a metal channel member upon which there is secured a pair of upright rods 11—11. These rods are in spaced-apart relation and may be of any suitable length sufficient to guidingly receive a plurality of molding pans or containers 12 and associated followers, as generally indicated at 13. The molds and followers are disposed in alternate stacked relation as shown in Figure 2, or if a single molding container and follower are to be utilized they will be arranged on the rods as shown in Figure 1.

As more specifically shown in Figures 4 and 5, the molding containers for receiving the meat product comprise a pan 14 which is preferably constructed of suitable metal such as stainless steel as by stamping or otherwise so as to be devoid of seams or joints and present a smooth inner surface. This pan is provided with an open top and preferably the pan brim is deflected to form an outstanding rim portion 15 for strengthening the pan adjacent its open side. While this container may be of various shapes as may be desired, it is shown herein as being substantially rectangular.

The ends of the containers are provided with ears 16 having spaced leg portions 17 and 18 which are disposed respectively adjacent the top and bottom portions of the pan. These leg portions are provided with aligned apertures 19—19 which are adapted to receive one of the guide rods 11 therethrough. The guide rods are so spaced apart that the end-ears of the pan may be mounted on the rods and slid therealong. However, it will be noted that with this arrangement the pan will be supported against tilting movement either longitudinally or transversely.

The ears 16 preferably project beyond the rim portion 15 of the pan and serve to protect the pan rim at the pan ends from damage.

The presser member comprises a plate 20 which is suitably shaped to fit within the container and engage the upper surface of the meat product therein. Adjacent the ends of the plate 20, there are provided upwardly extending generally U-shaped members 21 which have their leg portions 22 and 23 extending upwardly from the plate surface. The legs 22 are outwardly disposed and the legs 23 inwardly disposed. These legs are preferably of the same length, and each leg 22 is outwardly deflected to provide a right-angled outwardly projecting lug portion 24 which is provided with an aperture 25 arranged to be axially aligned with the apertures 19—19 of the pan ears 16. The U-shaped members 21 may be secured to the plate in any suitable manner, but are preferably welded thereto.

For further strengthening the presser construction, I have provided an edgewise disposed bridging member 26 which extends between the spaced legs 23—23 of the members 21 and is secured at its ends thereto and also the plate portion by welding or otherwise. The member 26 is preferably provided with suitable openings to permit the flow of water therethrough. In the present instance circular openings 26' are shown, as well as openings 26'' which are formed by cutting off the lower corners of the member.

It will be seen that the upper surfaces of the portions 24, and the upper edges or ends of the legs 23 and the upper edge of the bridging member 26 are all flush and lie in the same plane.

While the above construction has been specifically described, it will be appreciated that the presser may embody different constructional details so long as it may perform its functions and operate in the manner set forth herein.

As previously stated, the container and presser members may be utilized as a single unit as shown in Figure 1 or as a multiple unit as shown in Figure 2. In either case, means are provided for applying pressure to cause relative movement between the container and presser and thus compress the meat product in the mold container. Any suitable pressure applying means may be utilized, and this pressure may be applied to an equalizer bar such as shown at 27 in Figures 1 and 2, this bar being apertured at its end to slide over the spaced guide members 11—11 and extend across the presser member and rest upon the upper surfaces of the deflected portion 24 and the uppermost edges of the projecting portions 23—23 and bridging portion 26. On the other hand, if desired the pressure may be applied directly to the portion 24—24 of the uppermost presser member. This arrangement is shown in Figure 7.

In the present instance, I have shown jacking or pressure creating devices 28—28 which are respectively associated with the guide members 11—11. These jacks are of well known construction and briefly comprise, as shown in Figure 3, a hollow casing 29 which is slidably supported on a guide member. The casing 29 forms a housing within which there is mounted a pair of tiltable plate assemblies 30 and 31, the former constituting a holding member and the latter an actuating member. The plates 30 and 31 are respectively provided with apertures 32 and 33 for receiving the guide rod therethrough. These apertures are of such size that the plates will grip the rod 11, when the plates are tilted, but will be freed relative to the rod 11 when the plates are in substantially horizontal position.

The plate 31 is normally held in horizontal position by a pair of springs 34 and 35 having adjacently disposed ends bearing against the plate 31. The other end of the spring 35 bears against the housing, and the other end of spring 34 bears against the upper surface of plate 30. The action of these springs tends to force the plate 30 into a tilted position in which it opposes upward movement of the casing 29 along the rod 11. In order to actuate the jacks through successive downward movement along the rod 11 to apply pressure, there is provided a handle 36 which is fulcrumed as shown at 37 for swinging movement. On the opposite side of the fulcrum 37 from the handle portion there is provided an abutment pin 38 which engages the under surface of the plate 31 at one end thereof. By moving the handle downwardly the movement of the pin 38 is such that it tilts or cants the plate 31 and causes it to grip the rod 11. Since the handle is fulcrumed on the casing 29, the result is to force the casing downwardly. During this movement, the holding plate 30 is released relative to the rod, but as soon as the handle is swung in the opposite direction, the plate 31 moves downwardly under the action of the associated springs and upward movement of the casing is prevented by the gripping action of the holding plate 30.

With the jacks described above, it is possible to secure relatively high pressures, and it will be appreciated, of course, that any other suitable pressure applying means may be utilized.

As the jacks or other means employed are moved downwardly along the rods to apply pressure, this pressure is not applied directly to the presser member, but is applied through coil springs 39—39 which are disposed around the guide rods respectively. One end of each spring engages an end of the equalizer bar, if used, or the adjacent portion 24 of the presser. The other end of the spring 39 bears against a slide block 40 or other suitable locking device which is disposed between the adjacent end of the spring and the lowermost end of the jack. This block is provided with any suitable holding means. A set screw 41 is shown so that the block 40 may be secured against movement along the associated rod 11.

In utilizing the apparatus for multiple molding, the hams or other meat products are placed in the containers 12 and the pressers are respectively fitted within the containers, the whole being placed in stacked relation in the press. With the set screws 41 loosened, the jacks are manipulated to compress the springs 39—39 and apply the proper pressure to the pressers. The proper pressure having been obtained, the set screws 41—41 or other holding means are then tightened.

The ham or other meat product is thus held under pressure by the action of the springs 39—39, and if desired, the jacks 28—28 may be removed and utilized with another apparatus. The entire apparatus may then be placed in suitable boilers or other cooking devices for the further processing of the container contents, during which the springs 39—39 act to resiliently retain the presser members in contact with the contents of the containers regardless of any movement of the contents during the processing.

An additional advantage of the apparatus will be apparent where it is desired to chill the container contents after cooking or other treating operations. It is not necessary to retain the containers and pressers assembled on the guide rods, but the containers may be removed, and if desired the pressers may be utilized with other containers for compressing the product. This results in a saving on the amount of equipment necessary and permits of economical operation.

The apparatus which has been previously described and is shown in Figure 2 is primarily adapted for use with open tanks. In Figures 8, 9, and 10, I have shown apparatus which is adapted for use with closed tanks. While the latter construction in general embodies the features of the previously described apparatus, there are a number of modifications therein which will now be described.

Instead of mounting the springs on the guide members, the arrangement for closed tanks utilizes coiled springs 42—42 which are arranged to be interconnected between the base member 10 and the equalizer bar 27'. For such purpose, the equalizer bar is provided at its respective ends with adjustable strap members 43 which terminate at their innermost ends in hook portions 44.

The base member 10 is likewise provided with additional rod members 45 which are placed outside of the guide members 11—11, the rod members being secured at their one end to the base member and terminating at their innermost ends in hook portions 46. The hook portions 44 and 46 are adapted to respectively receive thereover looped ends formed on the springs 42—42.

As shown in Figure 8, the springs 42—42 are chosen of such size and length that when they are extended and stressed with their ends disposed over the hooked portions 44 and 46, these springs will exert the required pressure between the molds and followers to properly compact the meat product in the molds.

The follower members in this construction are slightly different than previously described insofar as their parts for abutting an adjacent mold bottom are concerned. In the present instance, the follower plate 20 is provided adjacent its ends with inverted U-shaped members 47—47 which are provided with oppositely extending extensions 48—48 from their bridging portions. These extensions are suitably apertured to receive the guide members 11—11 therethrough. Between the members 47—47 is a centrally disposed inverted U-shaped member 49. The bridging portions of the members 47—47 and member 49 define abutment surface for engagement with the bottom of the adjacently disposed mold thereabove. The members 47 and 49 may be secured to the associated plate 20 in any desirable manner as by welding.

In order to facilitate stretching of the springs 42 and their attachment and detachment to the hook portions 44 and 46 of the apparatus, I have provided a suitable tool as shown in Figures 11, 12, and 13 for such purpose.

This tool comprises an elongate rod-like member 50 which is mounted for axial reciprocal movement within the bore of an elongate sleeve member 51. The members 50 and 51 are respectively provided with projections 52 and 53 or other means adapted to receive the looped ends of a spring 42 thereover.

Mounted on the sleeve is a rotatable shaft 54 which is provided with a toothed pinion 55 which is arranged to mesh with the teeth of a rack formed along one side of the member 50. The shaft 54 also carries a handle 57 by means of which the shaft 54 may be rotated to actuate the rack and pinion to move the members 50 and 51 in opposite directions.

It will be noted that when the members 50 and 51 are moved in opposite directions away from each other or extended, a spring 42 supported between the projections 52 and 53 will be lengthened and thus stressed.

In order to latch the members 50 and 51 in extended position, there is provided a pawl 58 which is pivoted intermediate its ends on a pivot pin 59 supported on the sleeve member. One end of this pawl is arranged to engage the teeth of the rack, and the opposite end of the pawl forms an extension 60 between which and the sleeve there is disposed a spring 61 for normally actuating the pawl in a latching direction. By manually depressing the extension 60 against the spring 61, the pawl may be released, when desired, to permit movement of the projections 52 and 53 towards each other.

The sleeve 51 is provided with a handle portion 62 by means of which the tool may be conveniently handled.

The use of the tool for attaching and detaching the springs to the apparatus is clearly shown in Figure 13. In utilizing the tool, the members 50 and 51 are adjusted so as to receive the looped ends of the unstressed springs over the projections 52 and 53. Then by turning the handle 57, the projections 52 and 53 may be moved apart and the spring prestressed and lengthened the proper distance to permit hooking its looped ends over the hook portions 44 and 46 of the apparatus. The latch 58 may then be released to enable removal of the tool.

It will be appreciated that only one tool is necessary in order to attach and detach the springs of a plurality of the molding devices.

From the foregoing description, it will be apparent that the present invention provides improved apparatus for the molding and treating of hams and other meat products, wherein improved means are provided for obtaining pressures simultaneously in a multiplicity of molds during the processing thereof; apparatus including an improved molding pan or container which is provided with ears arranged for association with guide members in such a manner to enable movement of the pan along the guide members, but support the pan against tilting; which includes improved presser elements for cooperating with the containers; which enables the practice of a novel method of multiple molding of the product; which embodies molding elements that may be utilized interchangeably as a single or multiple unit arrangement; which provides improved molding apparatus having removable pressure applying springs that may be stressed, attached and detached by means of a novel tool; and which is simple of construction, efficent in operation and economical of use.

It is, of course, to be understood that although I have described in detail several arrangements of the present invention, the invention is not to be thus limited, but only insofar as defined by the scope and spirit of the appended claims.

I claim as my invention:

1. Apparatus for the multiple molding and processing of a meat product comprising a plurality of molds for the product, follower members respectively associated with each one of the molds, said molds and members being alternately disposed with each of said members supported for movement within a mold, alignment and guide means for said members, and means for resiliently applying compacting pressure to said followers including jacks associated with said guide means.

2. A multiple molding apparatus for meats comprising a pair of spaced uprights, a plurality of containers, a plurality of follower members respectively movably disposed in each one of said containers, said containers and members being alternately arranged in superposed relation and the members each having a part for engaging the container next above, aligning and guiding slide connections between the molds and the uprights and between the members and the uprights, and means for simultaneously relatively moving the containers and members to compress the contents of the containers.

3. A multiple molding apparatus for means comprising a pair of spaced guide members, a plurality of containers, a plurality of follower members movably disposed in said containers; said containers and members being alternately arranged, each of said followers having a portion for engagement with the next adjacent container, parts at the ends of the containers and followers slidably associated with the guide members, means for simultaneously relatively moving the containers and members to subject the contents of the containers to pressure, and resilient means common to all the containers and followers enabling movement of the contents of the containers, while subjected to pressure.

4. Apparatus for the multiple molding of meats comprising spaced guide members, a row of alternately disposed containers and pressing members extending between the guide members, connections between the containers and the guide members and between the followers and the guide members, said connections enabling aligning movement of the containers and pressing members under the guidance of the guide members, but opposing tilting movements thereof, and means for subjecting the row of containers and pressing members to a pressure for compressing the contents of the containers.

5. A multiple molding apparatus for meats comprising a pair of spaced guide members, a plurality of containers, a plurality of follower members movably disposed in said containers, said containers and members being alternately arranged, each of said followers having a portion for engagement with the next adjacent container, parts at the ends of the containers and followers slidably associated with the guide members, means for actuating said containers and members to subject the contents of the containers to pressure, and means for securing the containers and members against inadvertent release of pressure from the contents of the containers.

6. Apparatus for the multiple molding of meats and the like comprising a pair of spaced guide members, a plurality of containers, pressing members movably disposed within the containers, said containers and members being alternately disposed and separately slidingly connected with the guide members for alignment thereof, an equalizing bar associated with the endmost presser member and having its ends slidingly connected with the guide members, jack units respectively carried by the guide members, springs respectively disposed between the jacks and equalizer bar, and means for securing said springs in stressed condition.

7. In apparatus for the molding of meat products, a guide, a container for the product to be molded, a member carried by the container having two aligned widely spaced apertures adapted to slidingly receive the guide therethrough, said guide and apertured member cooperating to retain the container against tilting, and pressure applying means including a movable plate disposed in the container.

8. As an article of manufacture, a mold for use with meat molding apparatus comprising a container for receiving the meat to be molded, and ears at opposite sides of the container each having the two widely spaced aligned apertures therein adapted to receive a guide member therethrough and cooperate therewith to retain the container against tilting movements.

9. As an article of manufacture, a presser for use with a meat mold comprising a plate portion, raised ears at opposed sides of the plate portion formed for sliding cooperation with spaced guide members, and a member capable of transmitting pressure to the plate portion extending above the plate portion between the ears at the level of the ears.

10. As an article of manufacture, a presser for use with a meat mold comprising a plate portion for compactingly contacting meat in the mold on being forced below the rim of the mold, ears at opposed sides of the plate portion raised thereabove and extending outside the edges of said sides for cooperation with guide members disposed outside the mold, and a member rising from the plate portion between said ears at least to the level of said ears for transmitting compacting force to said plate portion.

11. As an article of manufacture, a mold for use in with meat molding apparatus comprising a container for receiving the meat to be molded and members at opposite sides of the container extending along said sides between spaced points above and below the middle level of said container, said members being apertured at said points to receive a guide member therethrough and cooperate therewith to retain the container against tilting movements.

FRANK H. HOY.